United States Patent
Skaare

(10) Patent No.: US 9,702,344 B2
(45) Date of Patent: Jul. 11, 2017

(54) CONTROL METHOD FOR A FLOATING WIND TURBINE

(75) Inventor: Bjorn Skaare, Trondheim (NO)

(73) Assignee: HYWIND AS, Stavanger (NO)

( * ) Notice: Subject to any disclaimer, the term of this patent is extended or adjusted under 35 U.S.C. 154(b) by 912 days.

(21) Appl. No.: 13/265,909

(22) PCT Filed: Apr. 26, 2010

(86) PCT No.: PCT/GB2010/000836
§ 371 (c)(1),
(2), (4) Date: Jan. 13, 2012

(87) PCT Pub. No.: WO2010/122316
PCT Pub. Date: Oct. 28, 2010

(65) Prior Publication Data
US 2012/0098265 A1  Apr. 26, 2012

(30) Foreign Application Priority Data

Apr. 24, 2009  (GB) .................................. 0907132.5

(51) Int. Cl.
| F03B 13/10 | (2006.01) |
| F03D 7/04 | (2006.01) |
| F03D 7/02 | (2006.01) |
| F03D 13/25 | (2016.01) |
| B63B 39/06 | (2006.01) |

(52) U.S. Cl.
CPC ............ *F03D 7/042* (2013.01); *B63B 39/062* (2013.01); *F03D 7/0272* (2013.01); *F03D 7/0276* (2013.01); *F03D 13/25* (2016.05); *F05B 2240/93* (2013.01); *Y02E 10/38* (2013.01); *Y02E 10/723* (2013.01); *Y02E 10/727* (2013.01)

(58) Field of Classification Search
USPC ............. 290/53, 54, 43.44; 318/162, 400.07, 318/400.15, 400.16; 416/1, 61, 41, 147
See application file for complete search history.

(56) References Cited

U.S. PATENT DOCUMENTS

| 7,095,131 B2 * | 8/2006 | Mikhail et al. ................. 290/44 |
| 7,456,515 B2 * | 11/2008 | Nielsen ........................... 290/55 |
| 8,022,566 B2 * | 9/2011 | Loh et al. ....................... 290/44 |
| 8,026,623 B2 * | 9/2011 | Wakasa et al. ................. 290/44 |
| 8,174,136 B2 * | 5/2012 | Johnson et al. ................ 290/44 |
| 8,186,949 B2 * | 5/2012 | Nielsen et al. .................. 416/9 |

(Continued)

FOREIGN PATENT DOCUMENTS

| CN | 101012808 A | 8/2007 |
| CN | 101218432 A | 7/2008 |

(Continued)

OTHER PUBLICATIONS

State Intellectual Property Office of the People's Republic of China—2nd OA—App No. 201080026088.4—Jun. 5, 2014.

*Primary Examiner* — Vanessa Girardi
(74) *Attorney, Agent, or Firm* — Eversheds Sutherland (US) LLP

(57) ABSTRACT

A controller for a floating wind turbine is adapted to cause the wind turbine to extract energy from wave-induced motion of the turbine. The controller controls the rotor speed of the turbine by controlling the torque of the load presented to the rotor such that the rotor speed varies in response to wave-induced motion.

28 Claims, 9 Drawing Sheets

(56) References Cited

U.S. PATENT DOCUMENTS

| | | | |
|---|---|---|---|
| 8,253,393 B2 * | 8/2012 | Bo et al. ..................... | 322/44 |
| 2007/0040388 A1 | 2/2007 | Nielsen | |
| 2007/0212209 A1 | 9/2007 | Borgen | |
| 2009/0008938 A1 * | 1/2009 | Erdman et al. ............. | 290/44 |
| 2009/0250932 A1 * | 10/2009 | Egedal ........................ | 290/44 |
| 2010/0003134 A1 | 1/2010 | Edwards et al. | |

FOREIGN PATENT DOCUMENTS

| | | |
|---|---|---|
| CN | 101223358 A | 7/2008 |
| CN | 101300422 A | 11/2008 |
| EP | 0223729 A1 | 11/1986 |
| GB | 2442719 A | 4/2008 |
| JP | 2003-070296 | 7/2003 |
| WO | 2005/021961 A1 | 3/2005 |
| WO | 2005/083266 A1 | 9/2005 |
| WO | 2005/090781 A1 | 9/2005 |
| WO | 2007/010322 A1 | 1/2007 |
| WO | 2007123552 A1 | 11/2007 |

* cited by examiner

CONTROL METHOD FOR A FLOATING WIND TURBINE

TECHNICAL FIELD

The present invention relates to the field of floating wind turbines. More particularly, it relates to a control system for floating wind turbine installations that maximises energy obtained from wave-induced motion.

BACKGROUND OF THE INVENTION

A wind turbine installation is usually formed of a support structure comprising an elongate tower, with a nacelle and a rotor attached to the upper end of the support structure. The generator and its associated electronics are usually located in the nacelle although they may be located elsewhere, such as at the base of the support structure.

Fixed-base wind turbines that are fixed either to the land or the seabed are well known. However, recently there has been a desire to develop floating wind turbines and various structures have been proposed. One example is a wind turbine installation where a conventional wind turbine structure is mounted on a buoyant base such as a platform or raft-like structure. Another proposal is a "spar buoy" type structure. Such a structure is formed of an elongate buoyant support structure with a rotor mounted on the top. The support structure could be a unitary structure or it could be an elongate sub-structure (similar to a conventional spar buoy) with a standard tower mounted thereon.

Floating wind turbine installations may be tethered to the sea bed via one or more mooring lines with anchors, or attached to the sea bed with one or more articulated (hinged) legs, for example, in order to hold them at their desired installation sites.

In conventional wind turbines, the rotor speed is controlled in order to regulate the power output. The manner in which this is done depends upon whether the wind speed is above or below the so-called rated wind speed for the turbine. For a given wind turbine and wind speed, the aerodynamic power depends upon the power coefficient $C_P$ of the turbine. This is a function of blade pitch angle $\beta$ and tip speed ratio $\lambda$. The latter is defined as the speed at which the outer tips of the rotor blades are moving divided by the wind speed. Every turbine has a characteristic optimum tip speed ratio (where $C_P$ is maximised), which is usually between 8 and 10.

The rated wind speed of a turbine is the lowest wind speed at which maximum power can be generated. When operating in winds below the rated wind speed, the control objective is to maximise power output and so the power coefficient must be maximised. This corresponds to optimum value of tip speed ratio. This operating regime is known as the maximum power regime.

The tip speed ratio may be optimised by adjusting the blade pitch angle to vary the aerodynamic torque produced by the turbine, or by adjusting the torque of the generator load experienced by the rotor. This latter arrangement is preferable because it enables the blade pitch to be set at the minimum ($\beta=0$) pitch angle (i.e. the most coarse angle), which maximises the power coefficient $C_P$. For a given blade pitch angle the torque presented to the turbine that maximises the power coefficient can be shown to be proportional to the square of the rotor angular velocity.

In contrast, when operating above the rated wind speed, the blade pitch is adjusted with the aim of producing a constant power output regardless of variation in wind speed to prevent excessively high power outputs that could damage the generator and/or its associated electronics. This constant power is referred to as the rated power of the wind turbine. Thus, as the wind speed increases, the blade pitch is increased, i.e. made more parallel to the wind direction, in order to reduce the aerodynamic torque; in order to maintain constant power. Where the torque of the generator is variable, this can be increased to allow output power to increase even when the turbine has reached its maximum design speed. In fact, it is possible and quite common to change both pitch and generator torque above the rated wind speed in order to achieve a smooth generator power production. The generator torque, $T_G$, is then typically controlled according to $T_G=P_{Gmax}/\omega_G$, where $P_{Gmax}$ is the maximum (or rated) generator power and $\omega_G$ is the generator speed.

Floating wind turbines inevitably undergo significant movements due to the action of current, wind and waves upon them. Waves in particular cause the tower to oscillate at frequencies of about 0.05 to 0.2 Hz. These are rigid body motions (surge coupled with pitch, but mostly pitch). Usually, the size of the oscillations is minimised by modifying the geometry and weight distribution of the floating wind turbine.

However, it has been recognised that energy can be extracted from the waves by a wind turbine. As set out in WO 2005/021961, the turbine can act as a damping mechanism for wave-induced motion and thus extract energy from the waves. The amount of energy extracted from the waves depends on how the blades of the wind turbine are controlled in relation to the instantaneous velocity of the wind relative to the rotor blades. In particular, it is suggested that blade pitch be controlled in response to the motion of the tower so that thrust and power coefficients increase with increasing relative wind velocity. (An increased thrust coefficient implies a greater thrust force acting on the rotor area). The application also points out that maximum energy will be extracted if the system oscillates in resonance with the waves.

It will be appreciated that extracting wave energy in this manner is only useful when operating below the rated wind speed (the maximum power regime); when the wind speed is higher than the rated wind speed maximum output power can be obtained from wind energy alone.

As noted above in the context of conventional turbine control, in this region it is desirable for generator torque rather than blade pitch to be adjusted to maintain the optimum tip speed (and hence maximise the power coefficient). Since the optimum torque value is a function of rotor velocity it can be obtained in the steady state using conventional controllers. However, in such controllers, there is a significant delay between a change in relative wind speed and the adjustment to the torque. This is inherent in the known control systems because there is a significant time constant from the change in wind speed to the corresponding change in rotor speed (which is measured). Firstly, there is a delay between the change in wind speed and the change in the aerodynamic torque that it causes, and secondly, because of the large moment of inertia of the rotor, there is a delay between the change in aerodynamic torque and the change in rotor speed that it causes.

Such time constants are not a serious drawback in the conventional control of wind turbines because significant sustained changes in wind speed usually occur over a much longer time period. However, the combined time constant is significantly larger than the period of the wave-induced oscillations and so it is impossible to use a conventional torque controller to fully maximise energy extraction from wave-induced motion. Indeed, it can be shown that the result of using such a conventional control system is the loss of almost half of the available wave-energy.

SUMMARY OF THE INVENTION

According to the invention there is provided a controller for a floating wind turbine, the controller being adapted to cause the wind turbine to extract energy from wave-induced motion of the turbine, wherein the controller controls the rotor speed of the turbine by controlling the torque of the load presented to the rotor such that the rotor speed varies in response to wave-induced motion.

Since the controller of the invention controls the turbine by controlling the torque of the load, it enables the blade pitch to be set to its optimum value, thereby enabling greater power output than in the prior art system where blade pitch must be varied in response to wave-induced changes in relative wind speed. Thus, the invention is based upon the recognition that, surprisingly, a suitably designed torque controller can be used in this context. As a consequence, a significant increase in the amount of wave-originating energy can be obtained.

The optimum value of the blade pitch is typically its minimum pitch angle (described herein as 0 degrees), which normally corresponds to the maximum value of the turbine's power coefficient $C_P$. Thus, in one preferred form of the invention, the blade pitch $\beta$ is set at its minimum setting or approximately that setting. However, in some embodiments, some (typically small) adjustment of the blade pitch may be useful in order to maximise power output and/or facilitate smooth control.

The controller of the invention is arranged such that the rotor speed may substantially maintain its optimum tip speed ratio as the turbine structure moves in wave-induced oscillations. Thus, it preferably determines the desired rotor speed ($\omega_{ref}$) to provide this ratio and adjusts the torque of the load accordingly. Since this may be achieved whilst the blade pitch angle is also set to its optimum value it allows the output power of the turbine to be maximised by enabling the turbine to operate at its optimum power coefficient.

The controller preferably controls the torque based upon an input which is indicative of the (wave-induced) motion of the turbine. This can be achieved by providing the controller with an input signal based upon the tower top velocity of the structure. This may most conveniently be a direct velocity measurement ($\dot{x}$). In this way the motion of the tower may be taken into account by the controller when determining the generator torque.

Most preferably, the tower velocity signal is used to determine the component of the desired rotor velocity due to wave-induced motion of the tower (referred to here as the "wave component"). This may, for example, be determined based upon the desired tip speed ratio. For example, the wave component of rotor velocity may be calculated from the product of the tip speed ratio and the tower velocity divided by the rotor radius.

In one embodiment, the desired or "reference" rotor velocity is defined as the sum of the wave component and a steady-state (wind-only) component ("wind component"). This reference velocity may then be used to calculate the desired torque. Typically, the required torque is proportional to the square of the reference rotor velocity.

The wind component is preferably obtained by filtering the measured rotor velocity using e.g. a low pass or band pass filter to remove components that are associated with wave motion. This filtered component may then be used to derive the respective component of the desired torque, for example using a look-up table or suitable formula.

In a typical implementation, the controller calculates two components of the required torque, one based on the (filtered) steady-state rotor velocity component and one based on the wave-induced rotor velocity component. These two components may then be summed to produce the desired torque value. It will be appreciated that the former component may be obtained in a similar manner to that of a conventional torque-based controller (i.e. one that is not designed to optimise wave energy). The latter component is preferably determined by means of a proportional (P) or proportional derivative (PD) controller.

In one embodiment of the invention, the controller comprises a control loop having separate branched to calculate the above-described two components of the desired rotor torque.

Preferably a first branch has as its input the rotor speed, applies a low pass filter thereto and then determines the respective component of the desired torque, e.g. based upon the desired torque being proportional to the square of the filtered rotor speed.

The second branch preferably has as its input the difference between the rotor speed and the reference rotor speed (i.e. a measure of the wave component of desired rotor speed). It calculates the respective component of the desired torque, preferably using a proportional or proportional derivative controller.

When the outputs of the two branches are summed, the desired value of torque is produced and this may be compared by a torque controller to the actual value of torque in order to determine the necessary control output.

It will be seen that the controller may therefore have inputs for signals representing rotor speed and the tower velocity.

In an alternative embodiment, in addition to the measured tower velocity, a further input is used, which is an estimate of mean wind speed. In this case the wind component of rotor velocity may be determined directly from the estimated wind speed, for example as the product of the optimum tip speed ratio and the estimated wind speed divided by the rotor radius.

In this embodiment there is no need to determine separate components of torque and the controller need not have the two branches described above. Instead the controller may have a single control loop where a value of the actual rotor velocity is compared to the reference rotor velocity and the difference is used to determine the desired torque value, for example using a proportional or proportional derivative controller as set out above.

In the preferred forms of the invention, the turbine is connected to a power grid which enables it to draw current during certain parts of the tower's oscillatory cycle. This may be necessary in some embodiments to achieve satisfactory rotor speed tracking.

It will be appreciated that, as with prior systems, the invention is useful at wind speeds below the rated wind speed of the turbine. Once that wind speed is exceeded, there may be little point in obtaining energy from waves. The controller may therefore be used in conjunction with, or form part of, a controller that enables the turbine to operate in the constant power regime in the manner well known in the art. Thus, the controller of the invention may be configured to disable the above-described (wave-related) functionality at a given wind speed (e.g. the rated wind speed or a value close thereto).

The invention also extends to a wind turbine structure comprising a controller as described above.

Thus, according to a further aspect of the invention there is provided a floating wind turbine structure comprising a buoyant tower with a wind turbine mounted thereto and a controller, the wind turbine being arranged to drive a load which presents a torque thereto and being adapted to extract energy from wave-induced motion of the turbine, wherein the controller controls the rotor speed of the turbine by controlling the torque of the load such that the rotor speed varies in response to wave-induced motion.

It should be understood that "floating" refers to the nature of the structure, i.e. one that is designed to float in a body of water, regardless of whether it is actually floating.

The structure may take any of the known forms, but it is particularly preferred that it be of the type having an elongate buoyant support described above.

The load may, most commonly, be an electrical generator, though it could be, for example, a hydraulic device. A gearing arrangement of some sort will usually be provided between the turbine and the load. Preferably the load is a variable-torque generator.

The controller preferably is as further described above.

The invention also extends to a corresponding control method. Thus, viewed from a still further aspect, the invention provides a method of controlling a floating wind turbine such that the wind turbine extracts energy from wave-induced motion of the turbine, wherein the rotor speed of the turbine is controlled by controlling the torque of the load presented to the rotor such that the rotor speed varies in response to wave-induced motion.

The method preferably incorporates the control steps and/or use of a controller as further described above.

As will be apparent to a person skilled in the art, the controller will normally be provided in the form of software. Thus the controller comprises a processor for running this software. The processors could be microprocessors, for example.

The present invention also relates to a software product comprising instructions which when executed by a processor cause the processor to control a floating wind turbine structure such that the wind turbine extracts energy from wave-induced motion of the turbine, wherein the rotor speed of the turbine is controlled by controlling the torque of the load presented to the rotor such that the rotor speed varies in response to wave-induced motion.

Preferably the software product is a physical data carrier. For example, a CD or floppy disk.

Alternatively or in addition, the software product could be provided in the form of instructions transmitted over a network, such as downloaded over the Internet, for example.

The present invention also relates to a method of manufacturing a software product which is in the form of a physical carrier, comprising storing on the data carrier instructions which when executed by a processor cause the processor to control a floating wind turbine structure such that the wind turbine extracts energy from wave-induced motion of the turbine, wherein the rotor speed of the turbine is controlled by controlling the torque of the load presented to the rotor such that the rotor speed varies in response to wave-induced motion.

As will be discussed in more detail below, simulation results (using Simo-Riflex-Hawc2) based on an embodiment on the invention assuming constant wind speed and regular waves with amplitude of 2 m and period of 9 seconds, showed increases in the wave energy extraction from 2.46% to 6.69% compared to conventional control.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

Certain embodiments of the invention will now be described, by way of example only, and with reference to the accompanying drawings.

DETAILED DESCRIPTION

Figure 15:
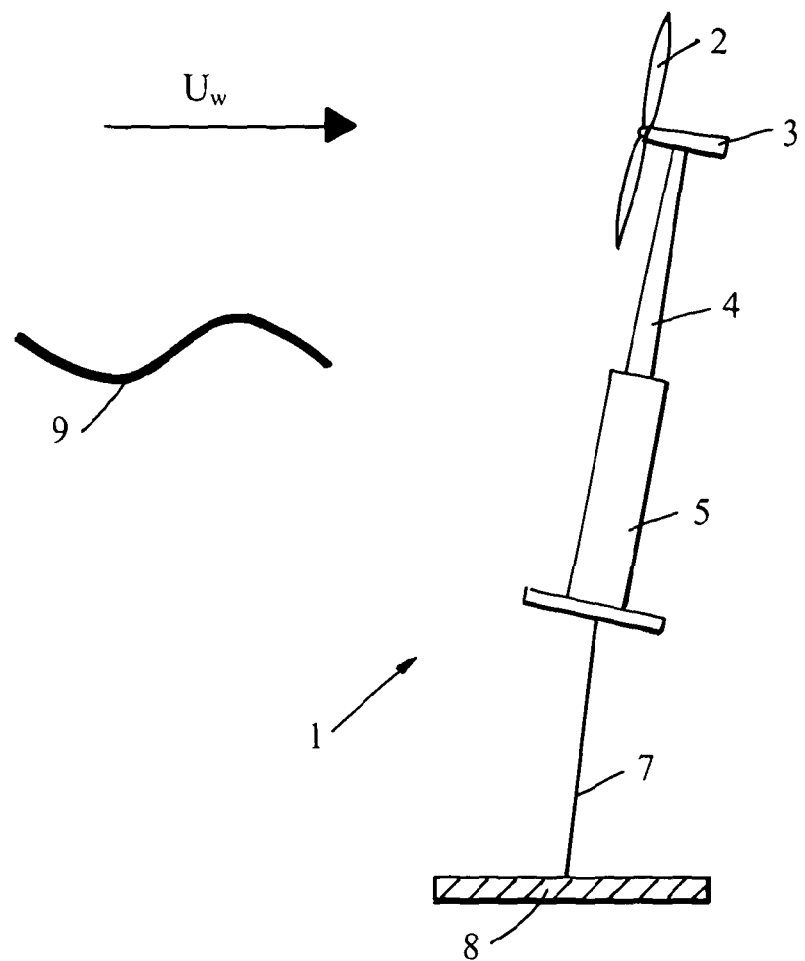
FIG. 15 is a wind turbine incorporating a controller according to an embodiment of the invention.

Turning first to FIG. 15, there is illustrated a floating wind turbine assembly 1. It comprises a turbine rotor 2 mounted to a nacelle 3. The nacelle is in turn mounted to the top of a structure which comprises a tower 4 secured to the top of a floating body 5 in the general form of a spar buoy. The floating body is secured to the sea bed by one or more anchor lines 7 (only one is shown). The nacelle contains an electrical generator which is connected to the turbine rotor by means of a reduction gearbox in the conventional manner (these items are not shown). Alternatively, the assembly could comprise a direct driven generator. The nacelle also contains a control unit.

When the rotor is turned by the wind it causes the generator to produce electricity in the well known manner. The rotor comprises variable pitch blades whose pitch angle β may be adjusted by the control unit. Its minimum pitch setting is defined as the zero degrees position. Other settings are represented by a positive angle. The optimal setting of pitch angle with respect to the power coefficient is zero with small variations around this value.

The controller also acts to vary the torque which the generator provides as a load to the turbine rotor 2. Thus, for a given rotor speed, the energy obtained from the wind, and hence the output power from the generator, can be varied.

Variation of the blade pitch and/or the torque is used to ensure that the turbine operates within its rotor speed and output power limitations. The lowest wind speed at which maximum power can be obtained is termed the rated wind speed for the turbine.

Since the turbine assembly 1 is floating in the sea (or other large body of water), it is subject to wave-induced motion. (The waves 9 on the water's surface are shown schematically.) As the turbine assembly 1 moves back and forth relative to the wind due to the wave excitation, it is possible to extract wave energy under operation below the rated wind speed for the turbine (it would not be useful to do so above the rated wind speed). Under the assumption of steady wind and harmonic motion for a floating wind turbine, the relative velocity between the wind and the turbine can be written as $$U_r = U_w - U_A \cos(\omega t + \theta) \quad (1)$$

where $U_r$ is the relative wind speed, $U_w$ is the incoming wind speed, $U_A$ is the velocity amplitude of the harmonic motion of the floating wind turbine, $\omega$ is the frequency of the harmonic motion, t is time and $\theta$ is a phase angle. By assuming constant power coefficient $C_p$, the aerodynamic power delivered by the turbine can be written as $$P = \frac{1}{2}\rho_a A C_p U_r^3, \quad (2)$$

where P is the aerodynamic power from the turbine, $\rho_a$ is the density of air and A is the area swept by the rotor. By substituting (1) into (2), the energy production over one cycle of oscillation is found to be $$E = \int_0^T P(t)\,dt = \frac{1}{2}TC_p\rho_a A U_w^3\left(1 + \frac{3}{2}\frac{U_A^2}{U_w^2}\right), \quad (3)$$

where $$T = \frac{2\pi}{\omega}$$

is the period of one cycle of oscillation. This equation provides the maximum obtainable value of E, i.e. where the power coefficient $C_p$ is kept at a constant, maximum value. $C_p$ is a function of both blade pitch β and tip speed ratio λ (the rotor tip speed divided by the wind speed, i.e. $\lambda = r\omega/U_R$ where r is the rotor radius) so this in turn requires that the rotor speed varies with the harmonic motion such that the tip speed ratio λ is kept at a constant, optimal value. In other words, to achieve the maximum value of E, the rotor speed must vary with the variation of the relative wind speed during each cycle of oscillation.

Leaving aside for the time being the matter of wave-induced changes in relative wind speed, the wind turbine is arranged to keep the tip speed ratio at the optimal value (or at least as close to it as possible) in response to changes in wind speed when the turbine operates below the rated wind speed. In order to do this the generator torque for a variable-speed wind turbine such as this can be controlled in a known manner. (This operation regime is often referred to as the maximum power regime.)

Figure 5:
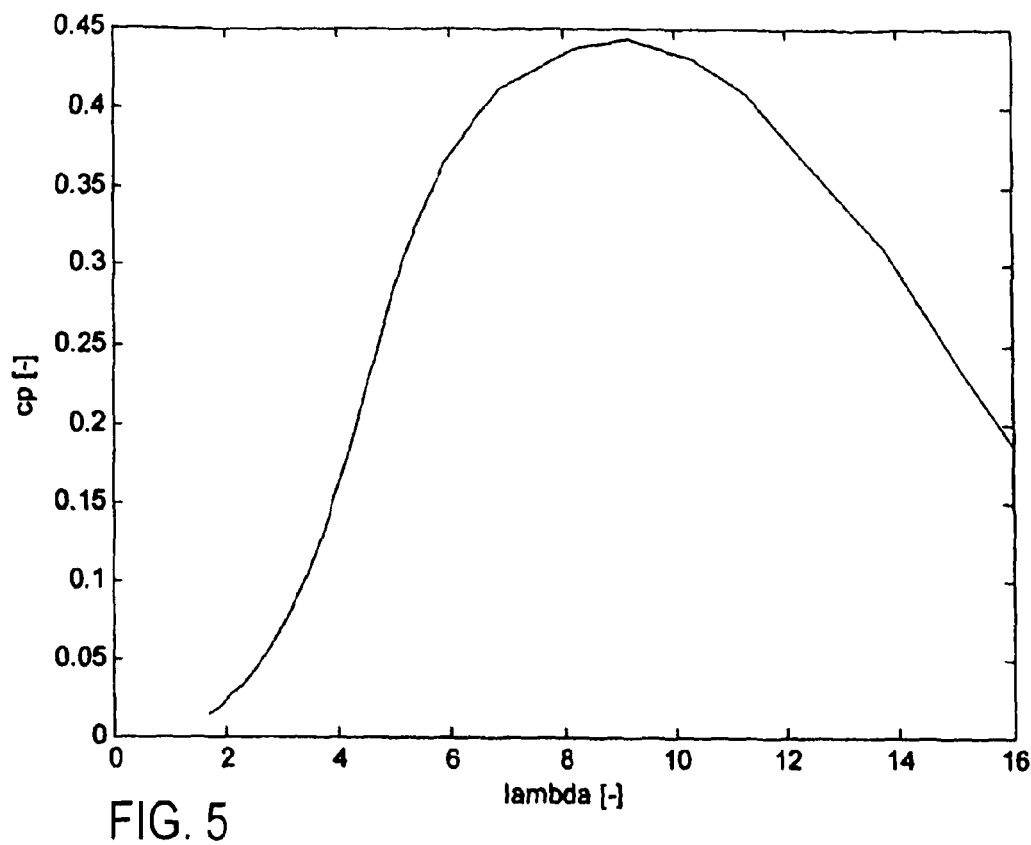
FIG. 5 is a graph showing the power coefficient as function of tip speed ratio for zero blade pitch angle for a typical wind turbine.

The ideal the operating point of the turbine is seen to be on the top of the parabola in the power coefficient curve shown in FIG. 5, with minimum blade pitch β (i.e. β=0) and this is the setting used in the embodiments described herein. However, in alternative embodiments, small changes to this setting may be made whilst operating in the maximum power regime to further optimise operation.

An optimal generator torque curve as function of the rotor speed can be found in the following manner:—

Since power P is the product of angular velocity and torque, it follows that $T_{EL} = P/\omega_t$ and so the desired, or optimal, generator torque transformed to the low speed side of the gear as a function of rotor speed is given as $$\begin{aligned}T_{EL}(w_t) &= \frac{1}{2}\frac{1}{w_t}r_a C_p(\lambda_{opt}, 0)pr^2 U_r^3 \\ &= \frac{1}{2}rC_p(\lambda_{opt}, 0)p\frac{U_r^3}{w_t^3 r^3}r^5 w_t^2 \\ &= \frac{1}{2}rC_p(\lambda_{opt}, 0)p\frac{1}{\lambda_{opt}^3}r^5 w_t^2 \\ &= C_{EL}w_t^2,\end{aligned} \quad (4)$$

where $T_{EL}$ is the generator torque transformed to the low speed side of the gear assuming an ideal gear without losses, $\omega_t$ is the rotor speed, $\lambda_{opt}$ is the optimal tip speed ratio, r is the rotor radius, and the constant $C_{EL}$ is given as $$C_{EL} = \frac{1}{2}rC_p(\lambda_{opt}, 0)p\frac{1}{\lambda_{opt}^3}r^5.$$

Equivalently, since for gear ratio n:1 the generator torque is related to the torque seen by the rotor by $T_G = T_{EL}/n$ and $\omega_t = \omega_g/n$ the optimal generator torque as function of the generator speed on the high speed side of the gear can be written as $$\begin{aligned}T_G(w_g) &= \frac{1}{n}T_{EL}\left(\frac{1}{n}w_g\right) \\ &= \frac{1}{n^3}C_{EL}w_g^2 \\ &= C_G w_g^2,\end{aligned} \quad (5)$$

where $\omega_g$ is the generator speed, n is the gear ratio, $T_G$ is the generator torque at the high speed side of the gear and the constant $C_G$ is given as $$C_G = \frac{1}{n^3} C_{EL}$$

$$= \frac{1}{n^3} C_{EL}$$

$$= \frac{1}{2n^3} r C_p(l_{opt}, 0) p \frac{1}{l_{opt}^3} r^5.$$

If a generator torque controller is based upon (4) and (5) alone, it is important to note that the optimal tip speed ratio is reached only in the steady state. There is a certain time constant from a change in the wind speed to a corresponding change in the rotor speed. The optimal tip speed ratio is therefore only achieved around a mean value of the wind speed. First, there is a time constant from a change in the wind speed to a change in the aerodynamic torque. Secondly, there is a time constant from a change in the aerodynamic torque to a change in the rotor speed due to the large moment of inertia of the rotor.

Figure 1:
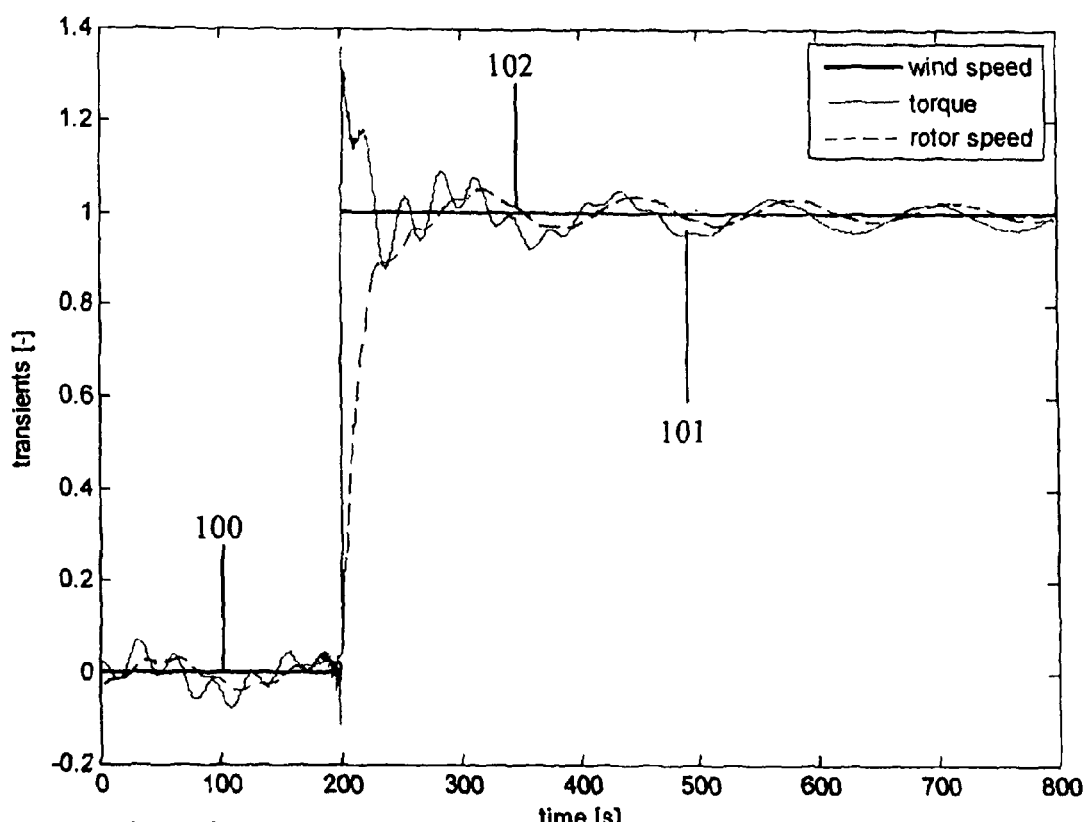
FIG. 1 is a graph showing non-dimensional values of the wind speed (100), aerodynamic torque (101) and rotor speed (102) for a typical wind turbine as a function of time.

This is illustrated in FIG. 1 where non-dimensional, transient values of the wind speed, aerodynamic torque and rotor speed are plotted as a function of time for a step in wind speed from 6 to 7 m/s. All variables have been transformed to take values between 0 and 1 in order to simplify the comparison of the time constants. The aerodynamic torque reaches its steady state value in 1.5 seconds while the rotor speed reaches its steady state value after 85 seconds, which is far greater than the typical period of wave-induced motion.

The turbine used in the embodiment of the invention is a typical 2.3 MW turbine. FIGS. 2-5 illustrate some relationships between power coefficient, tip speed ratio, aerodynamic power, rotor speed and wind speed for such a turbine and the corresponding optimal curve.

Figure 2:
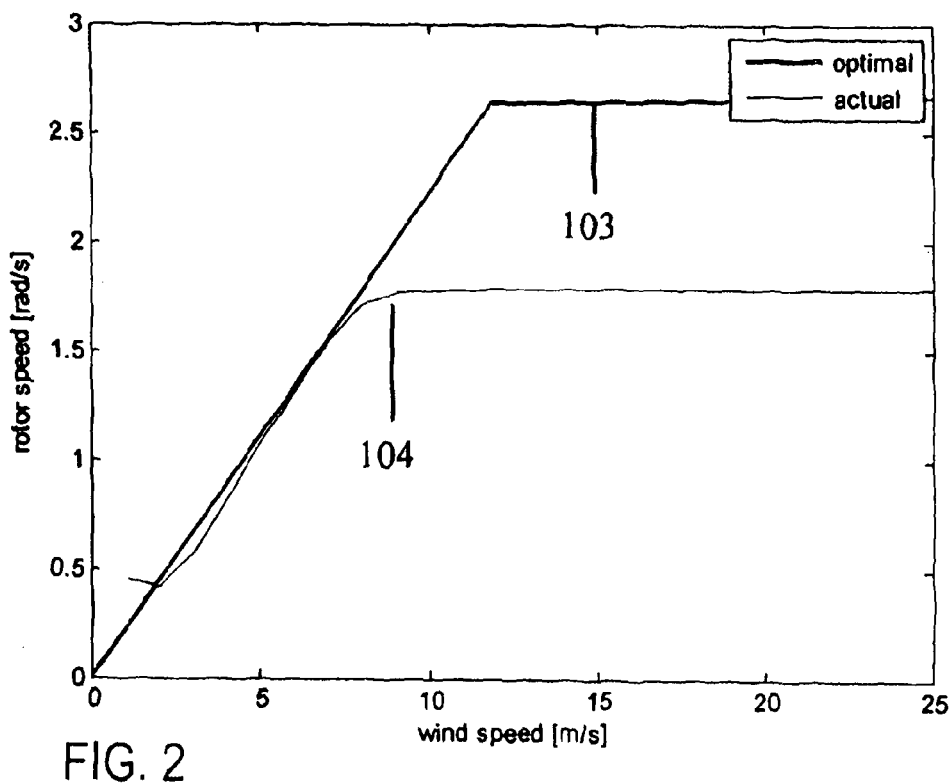
FIG. 2 is a graph showing rotor speed as function of wind speed for a wind turbine that operates with an optimal tip speed ratio (103) and an actual curve for a typical wind turbine as implemented in HAWC2 (104)

The rotor speed is shown as function of the wind speed for a turbine that operates with an optimal tip speed ratio and the actual curve for the turbine in FIG. 2. The reason for the large differences for wind speed above about 8 m/s is due to restrictions in the maximum allowable rotor speed for the turbine, which is equal to 1.78 rad/s for this specific turbine.

Figure 3:
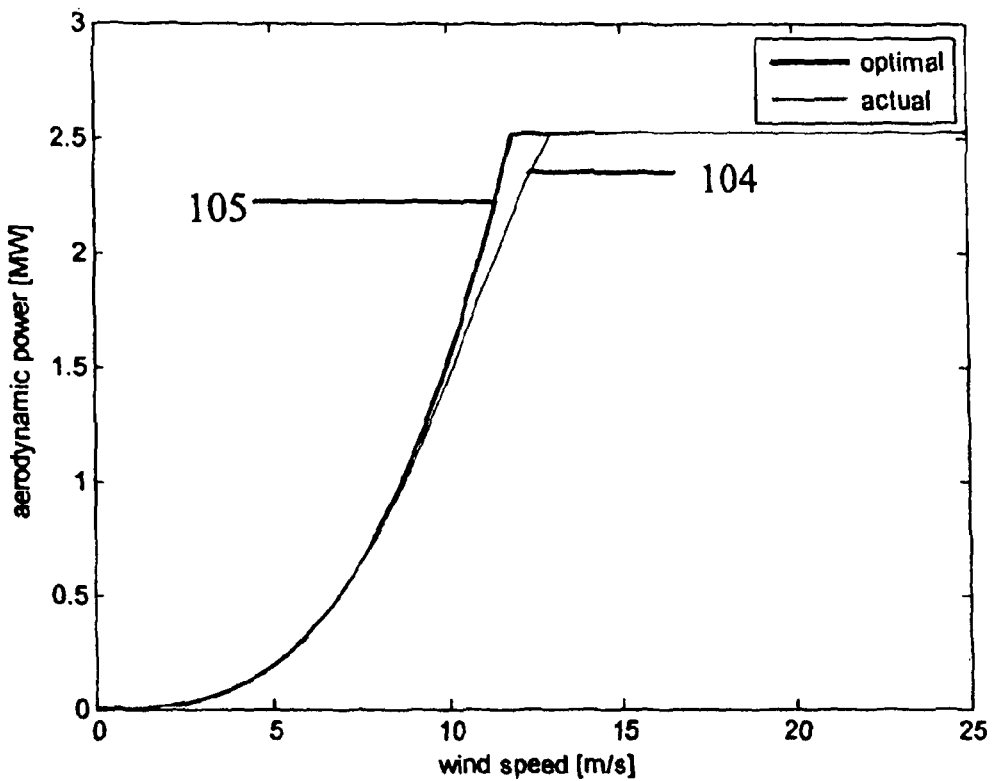
FIG. 3 is a graph showing aerodynamic power reference as function of wind speed for a wind turbine that operates with an optimal tip speed ratio (103) and an actual curve for a typical wind turbine as implemented in HAWC2 (104)

The effect of not being able to operate the turbine optimal due to the rotor speed restrictions shown in FIG. 2 is shown in the corresponding power curves of FIG. 3. It is seen that the actual power curve is below the optimal power curve from a wind speed of about 8 m/s and up to the rated wind speed for the turbine.

Figure 4:
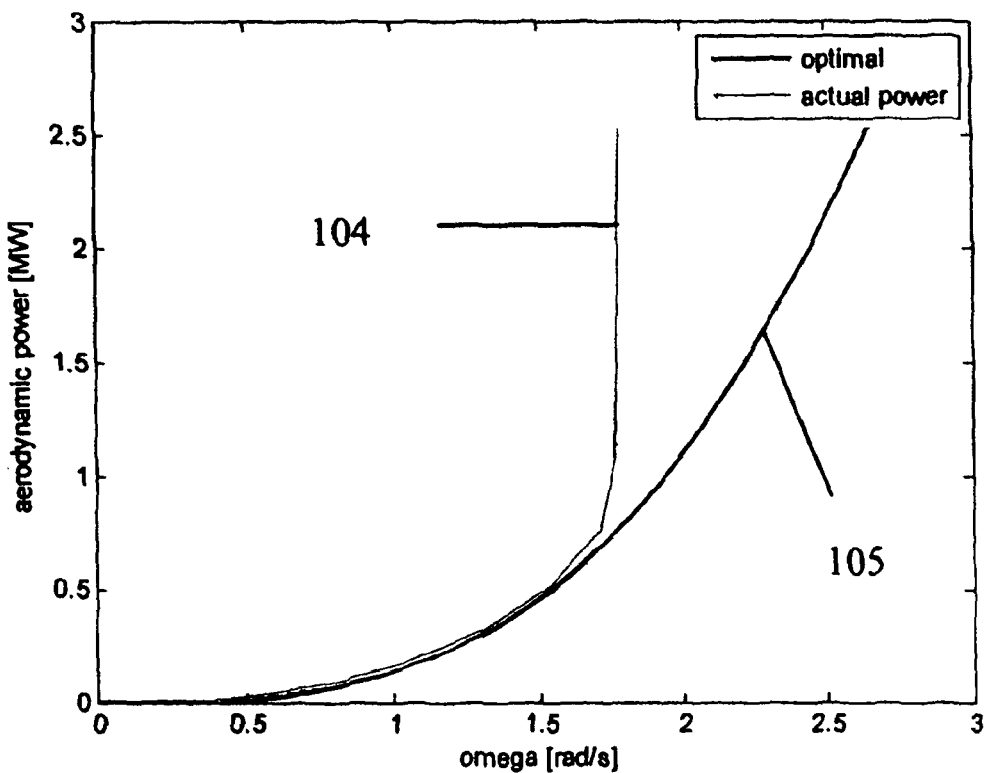
FIG. 4 is a graph showing aerodynamic power as function of rotor speed for a wind turbine that operates with an optimal tip speed ratio (103) and an actual curve for a typical wind turbine as implemented in HAWC2 (104)

The aerodynamic power curve as function of rotor speed is shown in FIG. 4, and this curve corresponds to the relationship between rotor speed and aerodynamic torque as given in equation (4). The power coefficient as function of the tip speed ratio is shown in FIG. 5, where the optimal tip speed ratio is seen to be around 9.

In contrast to the conventional controller, in order to achieve increased wave energy extraction below rated wind speed, the control unit of the first embodiment employs a generator torque controller with a novel rotor speed controller part as well as the conventional torque controller as described in equations (4) and (5) above. This additional part has an additional input based upon the tower velocity and will be described further below.

The reference signals to be used in the generator torque controller of the embodiment are:

$$\omega_{ref} = -\frac{\lambda_{opt}}{R} \dot{x}_{top} + \omega_{lp} \quad (6)$$

$$\dot{\omega}_{ref} = -\frac{\lambda_{opt}}{R} \ddot{x}_{top}, \quad (7)$$

where $\omega_{lp}$ is the low pass filtered signal derived from the measured rotor speed, $\omega$. It is assumed that the positive direction of the horizontal motion of the nacelle corresponds to the positive wind direction, such that it is optimal to reduce the rotor speed when the turbine is moving in the same direction as the wind.

It will be seen that equation (6) is a sum of two velocities. The first is the contribution to the rotor velocity by the wave-induced motion, assuming optimum tip speed ratio is achieved. The second is the no-wave wind-induced part. Equation (7) assumes that $\omega_{lp}$ is sufficiently constant that its derivative approximates to zero, i.e. that the rate of changes of the rotor speed due to wave-induced motion is much larger than those to due variations in the wind speed.

Figure 8:
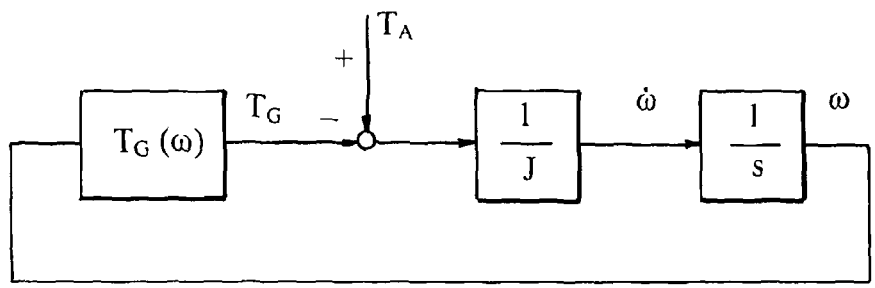
FIG. 8 is a diagram of a conventional torque controller.

Considering firstly the conventional controller shown in FIG. 8, the input to the (physical) system is the aerodynamic torque, $T_A$, and the output from the system is the rotational speed of the rotor $\omega$, in other words the aerodynamic torque that the wind acting on the rotor creates causes the rotor to run at speed $\omega$. The measurement in the system is $\omega$. The generator torque seen on the low speed side of the shaft is $T_G$ (Which corresponds to $T_{EL}$ in the previous discussion) and can be represented/calculated as a function $T_G(\omega)$ of the measured rotor speed. $T_G$ is the output from the controller.

In the dynamic process, the rotor acceleration is given as $\dot{\omega}=1/J^*(T_A-T_G)$, where J is the moment of inertia, by assuming a stiff shaft and using Newton's second law.

Figure 9A:
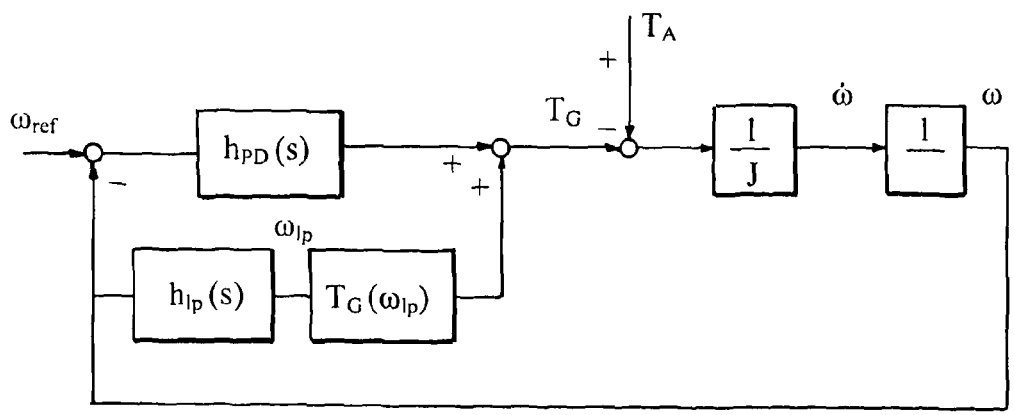
FIG. 9a is a diagram of a torque controller according to an embodiment of the invention.

The controller of the first embodiment can be regarded as a modified version of the above conventional controller and is shown in FIG. 9a. As may be seen, the rotor speed input to the conventional torque reference is the low pass filtered measurement of the rotor speed, while the additional rotor speed control loop contains a PD (proportional differential) controller and a rotor speed reference trajectory that is based on the measured tower top motion x in order to obtain a desired tip-speed ratio.

More specifically, as before the input to the physical system is the aerodynamic torque, $T_A$. The rotor speed reference, $\omega_{ref}$ is given by equation (6) above. The output from the physical system is the rotational speed of the rotor $\omega$. The measurement in the system shown is the rotor speed. In addition to this, the nacelle velocity is measured and used in the calculation of $\omega_{ref}$.

The generator torque seen on the low speed side of the shaft is $T_G$, which is the output from the controller. It consists of two components that are added. The first is a rotor speed tracking controller that gives an additional contribution to the conventional controller such that the rotor's speed varies with the wave induced motions of the nacelle in an optimal way. The rotor speed tracking controller takes the difference between a reference speed $\omega_{ref}$ and the measured rotor speed $\omega$ as input. The output is a generator torque signal. The second is a torque controller that behaves like the conventional torque controller of FIG. 8. This controller consists of a low pass filter (or band pass filter) that removes the wave frequencies, and the original torque controller function $T_G(\omega)$. The output is a generator torque signal with zero mean. The rotor acceleration $\dot{\omega}$ is as given above.

Figure 9B:
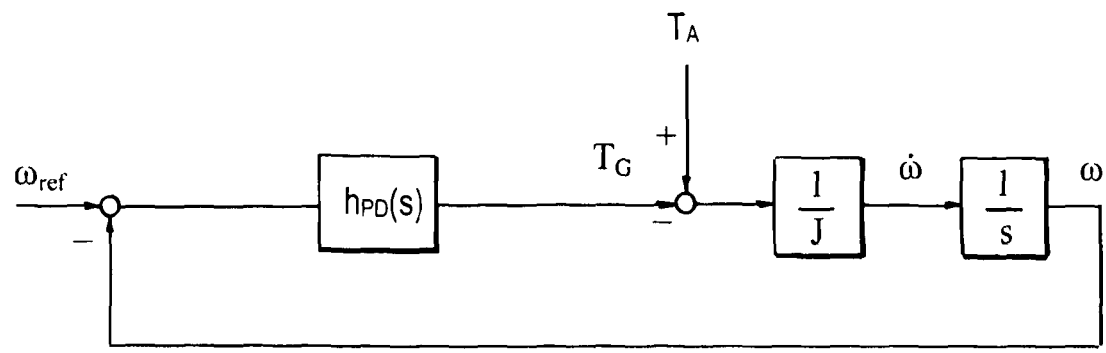
FIG. 9b is a diagram of a torque controller according to an alternative embodiment of the invention.

An alternative embodiment is shown in FIG. 9b. In this embodiment, input to the system is (again) the aerodynamic torque, $T_A$, and the rotor speed reference, $\omega_{ref}$ is given by:

$$\omega_{ref} = -\frac{\lambda_{opt}}{R}\dot{x}_{top} + \frac{\lambda_{opt}}{R}\hat{u}_{mean}, \quad (6a)$$

The output from the system is the rotational speed of the rotor, $\omega$. The measurement in the system is again the rotor speed. In addition to this, the nacelle velocity is measured and the mean wind speed is estimated and used to calculate $\omega_{ref}$ according to equation 6a above. The generator torque seen on the low speed side of the shaft is $T_G$, which is the output from the controller. The rotor speed tracking controller takes the difference between a reference speed and the measured rotor speed as input. The output is the generator torque signal.

Figure 9C:
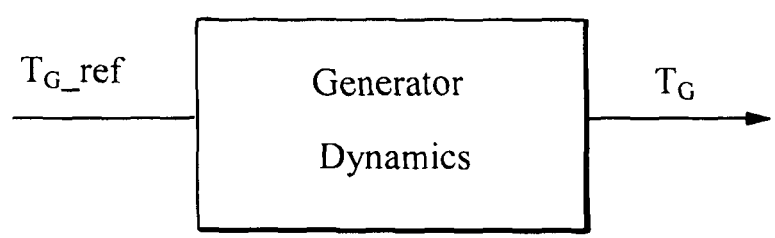
FIG. 9c is a diagram showing an optional additional feature for the controllers of FIGS. 9a and 9b.

In the embodiment described above it is assumed that the generator dynamics are fast compared to the rotor dynamics, such that the generator torque is the same as the commanded generator torque that is actually the output from the torque controller (this is a common assumption). However, in a modified embodiment, the generator dynamics are taken into account: to do this the features shown in the block diagram of FIG. 9c are connected between the controller output and the generator torque in FIGS. 9a and 9b.

The performance of the controllers described above, and in particular the FIG. 9a version will now be considered. It is assumed that the conventional torque controller part in FIGS. 9a and 9b will not affect the speed tracking controller since the two controllers operate in different frequency domains. The contribution from the conventional torque controller is assumed to be slowly varying since the controller is based on low pass filtered rotor speed with filter frequency below the wave frequency area, while the rotor speed tracking controller will be designed to operate in the wave frequency area in order to obtain a desired tip speed ratio. For this reason, the conventional torque controller part of the controller in FIG. 9a is neglected in the following discussion when considering the speed tracking controller around the low pass filtered rotor speed.

The PD controller in FIG. 9a can be represented with the transfer function $$h_{PD}(s) = K_P + K_D s, \quad (7)$$

where $K_P$ and $K_D$ are the proportional and derivative gains, respectively. By neglecting slowly varying effects, the dynamics of the closed system in FIG. 9a can be developed:

$$\omega = \frac{1}{(J + K_D)s + K_P} T_{A\_dyn} + \frac{K_D s + K_P}{(J + K_D)s + K_P} \omega_{ref}, \quad (8)$$

where $J$ is the moment of inertia for the rotor and the generator and $T_{A\_dyn}$ is the dynamic part of the aerodynamic torque. Further, the loop transfer function for the dynamic part of the system is given as $$h_0(s) = \frac{K_P + K_D s}{Js} \quad (9)$$

$$= \frac{K_P}{J} \frac{1 + \frac{K_D J}{K_P} s}{s}$$

The transfer function representing the control system's ability to follow a reference signal becomes $$M(s) = \frac{K_D s + K_P}{(J + K_D)s + K_P}, \quad (10)$$

while the transfer function representing the error between a desired reference signal and the measurement becomes $$N(s) = \frac{1}{(J + K_D)s + K_P} \quad (11)$$

The embodiment as described above employs a PD controller. However, a purely proportional gain controller can be introduced by setting the parameter $K_D$ in equations (9) and (10) equal to zero, resulting in the transfer functions $$\omega = \frac{1}{Js + K_P} T_{A\_dyn} + \frac{K_P}{Js + K_P} \omega_{ref} \quad (12)$$

$$h_0(s) = \frac{K_P}{Js} \quad (13)$$

$$M(s) = \frac{K_P}{Js + K_P} \quad (14)$$

$$N(s) = \frac{1}{Js + K_P} \quad (15)$$

Figure 10:
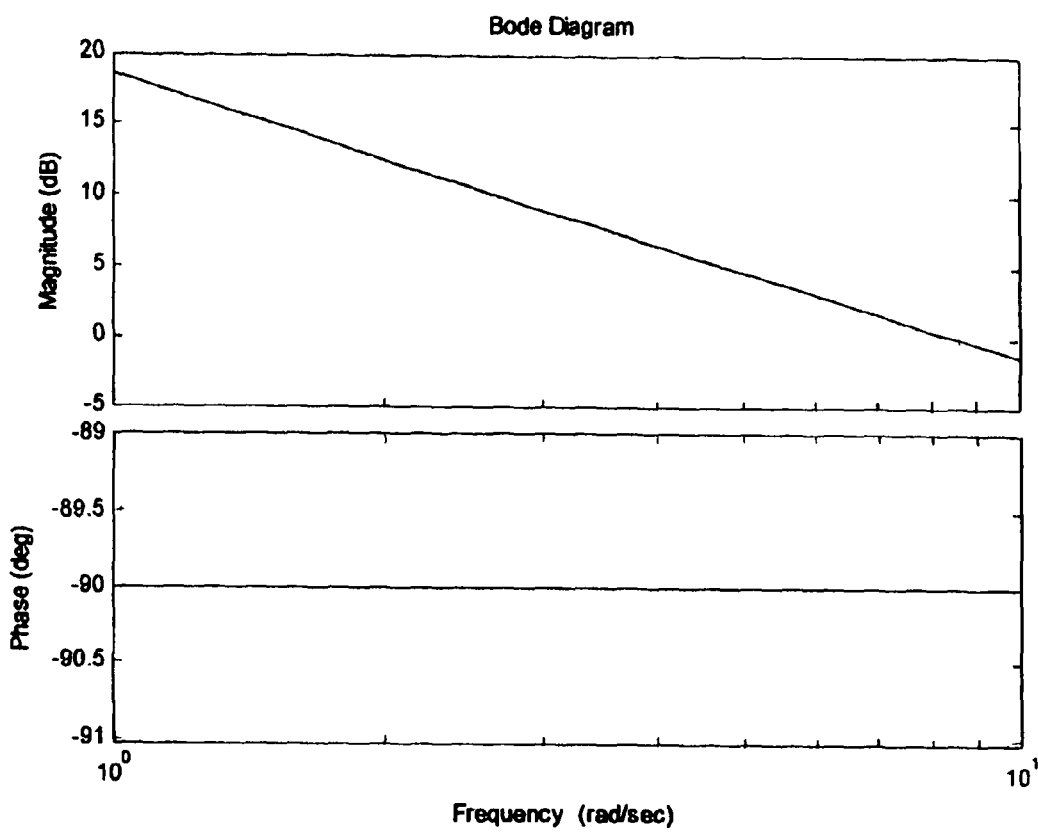
FIG. 10 is a Bode diagram for the closed loop rotor speed P-controller that may be used in the embodiments.

The bandwidth of the system with the P-controller is $$\omega_{0\,dB} = \frac{K_P}{J},$$

and the Bode plot for the system is shown with $K_P/J = \omega_{0\,dB} = 8.49$ in FIG. 10.

The benefits of the invention can be better understood by considering some simplified theoretical calculations of wave energy extraction. These are based on the actual power curve in FIG. 2, together with the power coefficient curve in FIG. 4. The following three cases are considered:

Fixed: Power extracted from a fixed foundation wind turbine during operation at a constant wind speed of 6 m/s.

Actual: Power extracted from a floating wind turbine during operation at a constant wind speed of 6 m/s and with sinusoidal tower top velocities with an amplitude of 1.18 m/s and a period of 9 seconds (this corresponds to the case with waves with 2 m amplitude and a period of 9 seconds in Simo-Riflex-Hawc2 simulations) under the assumption that the turbine operates with constant rotor speed corresponding to the optimal rotor speed at 6 m/s.

Optimal: Power extracted from a floating wind turbine during operation at a constant wind speed of 6 m/s and with sinusoidal tower top velocities with an amplitude 1.18 m/s and a period of 9 seconds under the assumption that the turbine operates with the desired tip speed ratio for the turbine, corresponding to the actual power curve in FIG. 2.

Figure 6:
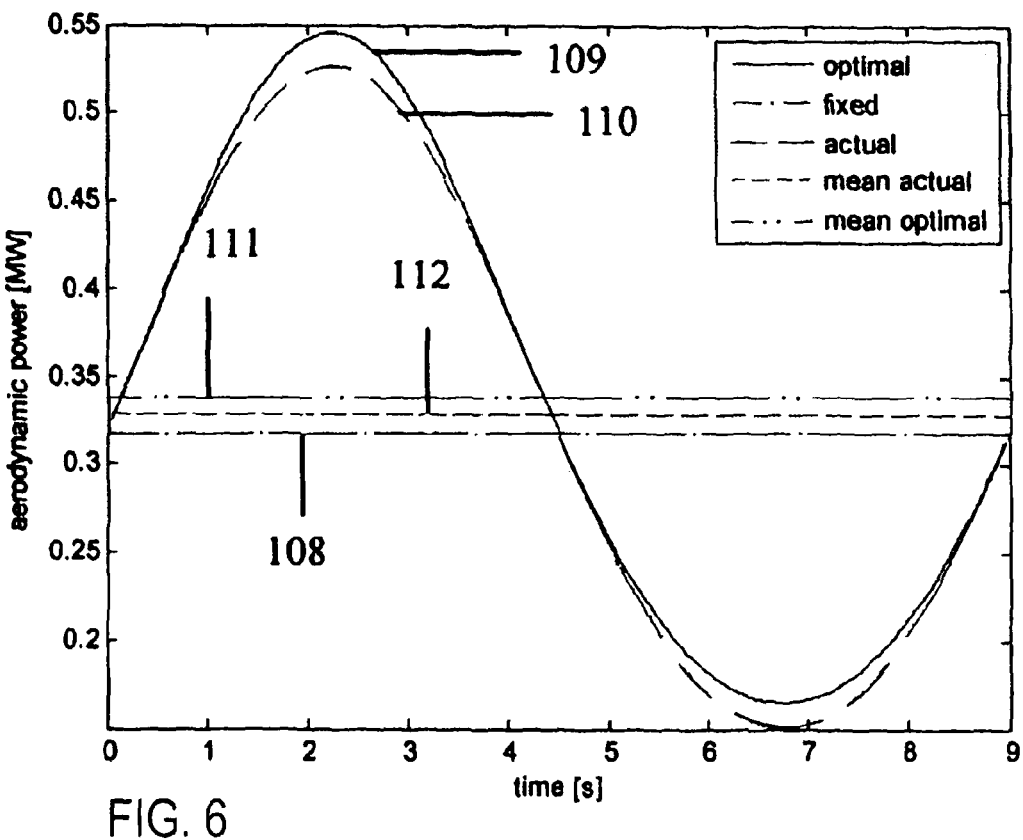
FIG. 6 is a graph showing the aerodynamic power as function of time during simulation with a constant wind speed of 6 m/s and a sinusoidal tower motion with a velocity amplitude of 1.18 m/s and a period of 9 seconds.

The results of the power calculations for the three different cases are shown as functions of time and relative wind speed in FIG. 5 and FIG. 6, respectively, and some key values are listed in Table 1. Note that use of equation (2) gives an estimate of the wave extraction part of the aerodynamic energy of 5.80% for velocity amplitude of 1.18 m/s, which corresponds to the calculations with the floating wind turbine with optimal rotor speed control in Table 1 below.

FIG. 6 shows the aerodynamic power for a fixed wind turbine (line 108), a floating wind turbine operating at optimal tip speed ratio (line 109) and a more realistic floating wind turbine operating with the rotor speed corresponding to the mean wind speed (line 110). The mean values for the aerodynamic power during operation with the optimal and the more typical tip speed ratios are shown in lines 111 and 112, respectively.

Figure 7:
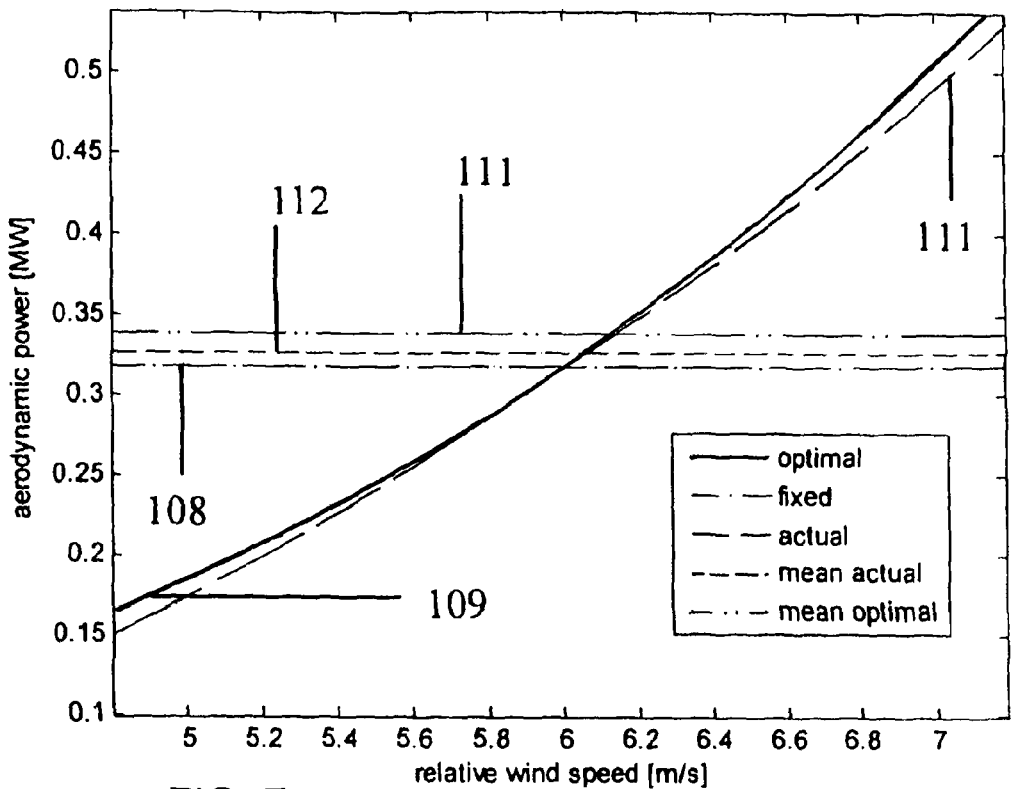
FIG. 7 is a graph showing the aerodynamic power as function of relative wind speed during simulation with a constant wind speed of 6 m/s and a sinusoidal tower motion with a velocity amplitude of 1.18 m/s and a period of 9 seconds.

FIG. 7 shows the aerodynamic power for a fixed wind turbine (line 108), a floating wind turbine operating at optimal tip speed ratio (line 109) and a more realistic floating wind turbine operating with the rotor speed corresponding to the mean wind speed (line 110). The mean values for the aerodynamic power during operation with the optimal and the more typical tip speed ratios are shown in lines 111 and 112, respectively.

TABLE 1

Simple calculations of aerodynamic power

| AERODYNAMIC POWER | MEAN [kW] | S.D. [kW] | INCREASED POWER PRODUCTION [%] |
|---|---|---|---|
| Fixed Foundation Wind Turbine | 318 | 0 | 0 |
| Floating Wind Turbine With Conventional Control | 328 | 134 | 3.03 |
| Floating Wind Turbine With Optimal Rotor Speed Control | 337 | 135 | 5.80 |

Simulation Study

The simulations in this section are carried out with the coupled analysis tool Simo-Riflex-Hawc2 with the concrete hull tower structure and a 2.3 MW turbine.

The environmental conditions in the simulations are a constant wind speed of 6 m/s and regular waves with an amplitude of 2 m and a period of 9 seconds.

The simulations in this section were carried out with a P-controller for rotor speed tracking control having the same parameters as used for plotting the Bode diagram of FIG. 10.

Figure 11:
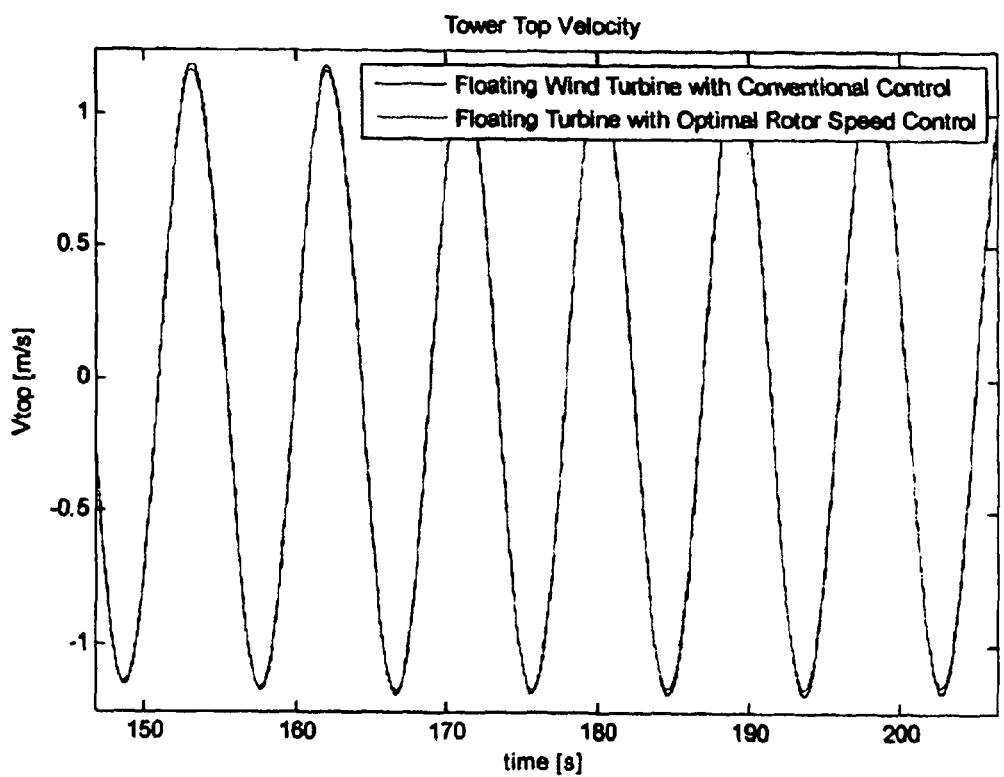
FIG. 11 is a snapshot graph of tower top velocity during simulations of floating wind turbines with conventional control (blue) and optimal rotor speed control (red)

A snapshot of the tower top velocity is plotted in FIG. 11 for a floating wind turbine with a conventional torque controller and a torque controller for optimal rotor speed control. It can be seen that the turbine motions are not affected significantly by the choice of controller.

Figure 12:
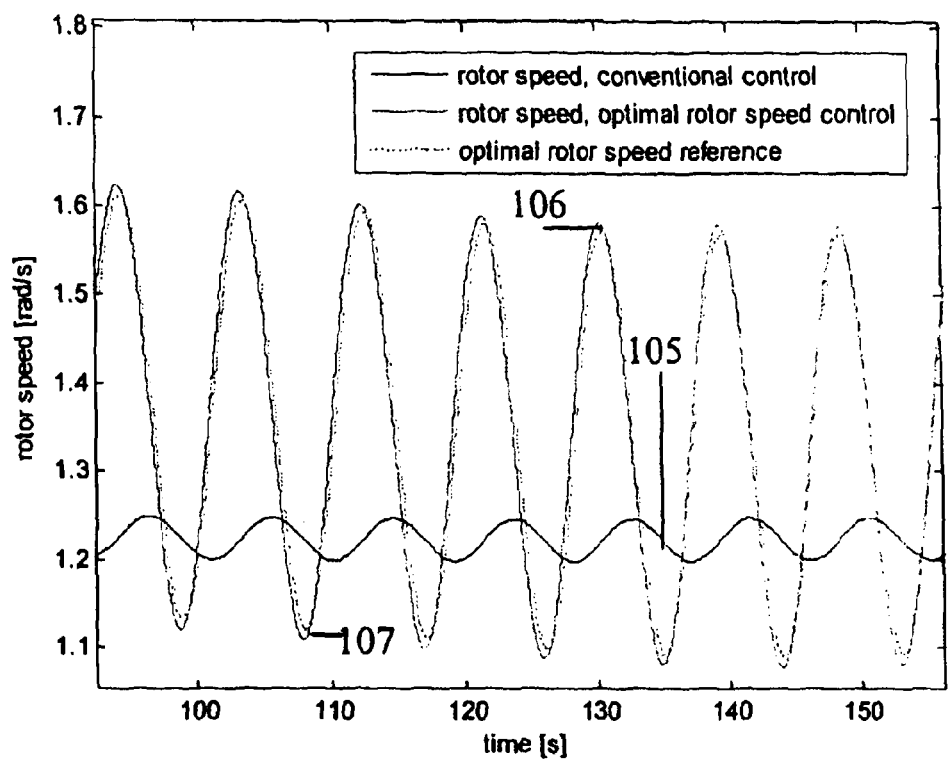
FIG. 12 is a snapshot graph of rotor speed during simulations of floating wind turbines with conventional control (105) and optimal rotor speed control (106) together with the optimal rotor speed reference signal (107)

The corresponding rotor speeds are plotted in FIG. 12 together with the optimal rotor speed reference signal. It may be seen that using a conventional controller there are only small reactions to the wave motion and the rotor speed is also out of phase with the optimal rotor speed reference signal. This indicates that the assumptions behind the "actual" curve in the simple calculations herein are reasonable. It is clear that the rotor speed follows the optimal rotor speed signal when the optimal rotor speed tracking controller is used.

Figure 13:
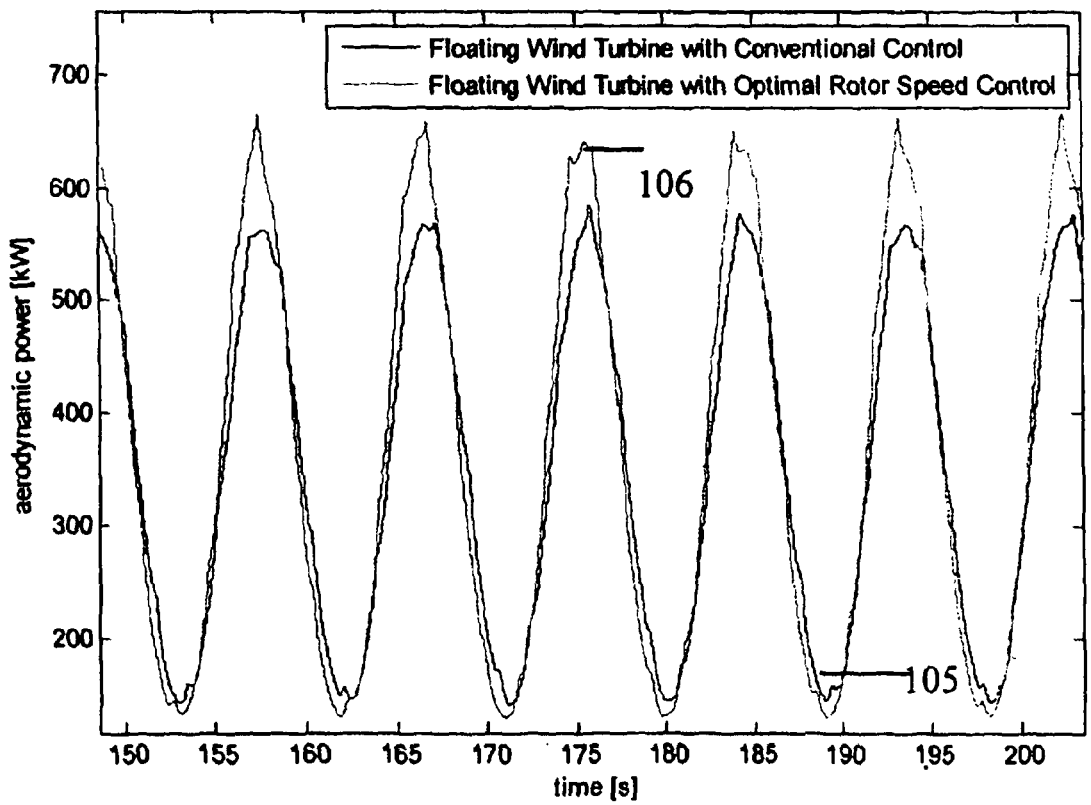
FIG. 13 is a snapshot graph of aerodynamic power during simulations of floating wind turbines with conventional control (105) and optimal rotor speed control (106)

A snapshot of the aerodynamic power with use of the two controllers is shown in FIG. 13, while some key data for the generator power, also with comparison to a fixed foundation wind turbine, are shown in Table 2 below.

TABLE 2

Key data for the generator power in Simo-Riflex-Hawc2

| GENERATOR POWER | MEAN [kW] | STD [kW] | INCREASED POWER PRODUCTION [%] |
|---|---|---|---|
| Fixed Foundation Wind Turbine | 284 | 0 | 0 |
| Floating Wind Turbine with Conventional Control | 291 | 13 | 2.46 |
| Floating Wind Turbine with Optimal Rotor Speed Control | 302 | 1338 | 6.69 |

Figure 14:
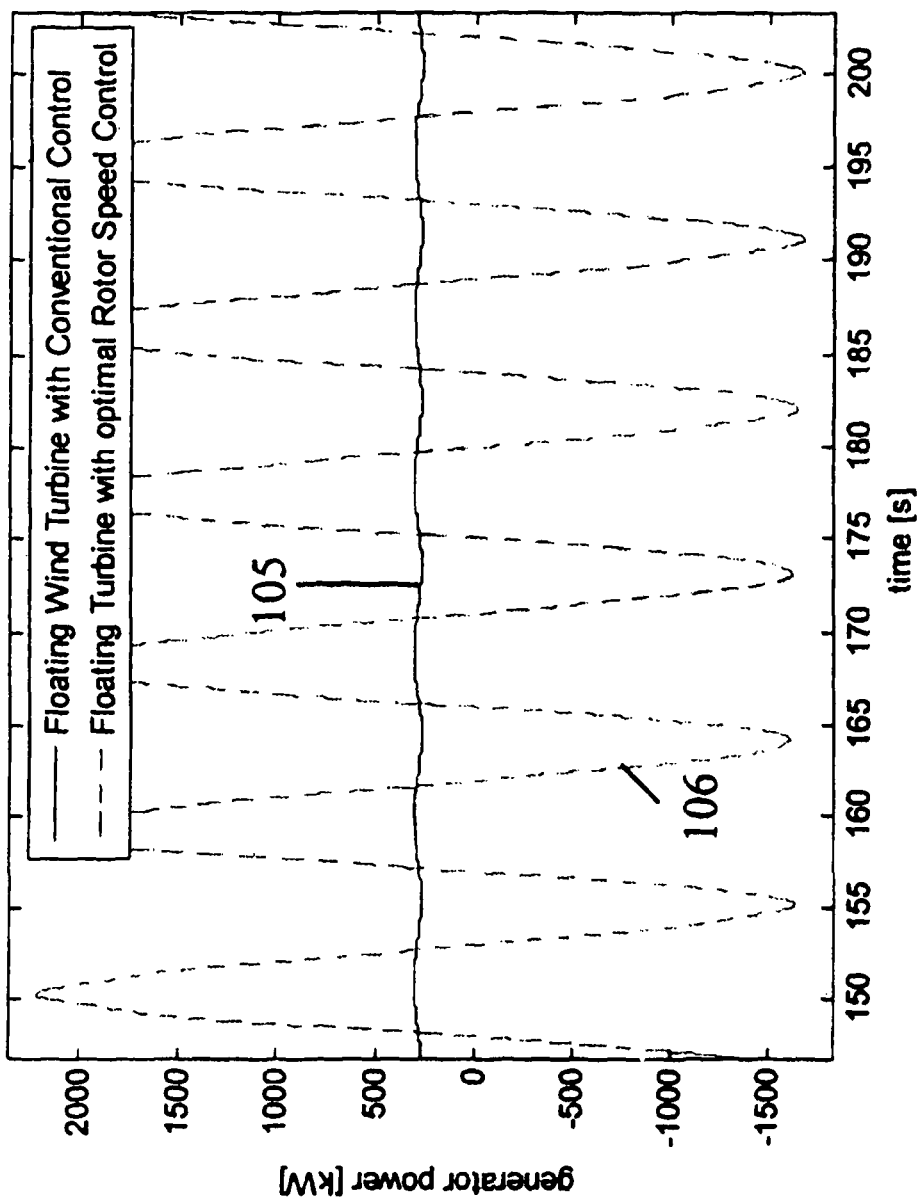
FIG. 14 is a snapshot graph of generator power during simulations with floating wind turbines with conventional control (105) and optimal rotor speed control (106)

A simulation snapshot of the generator power is shown in FIG. 14, while the key comparative data are given in Table 2 (above). It may be seen that the optimal rotor speed tracking controller requires large torque contributions such that energy is also extracted from the grid in parts of the fluctuating cycle. Note that the simple calculations for the increased aerodynamic power given in Table 1 coincide well with the calculated increased generator power that is found for the numerical simulations with use of Simo-Riflex-Hawc2 in Table 2.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A controller for a floating wind turbine, the controller being adapted to cause the wind turbine to extract energy from wave-induced motion of the turbine, the turbine having a rotor with a variable speed and a plurality of blades, wherein the controller controls the rotor speed of the turbine by controlling a torque of a load presented to the rotor such that the rotor speed varies in response to wave-induced motion.

2. A controller as claimed in claim 1 arranged to enable the blade pitch of the turbine to remain substantially at its minimum setting whilst the turbine is controlled during wave induced oscillations.

3. A controller as claimed in claim 1 arranged such that the rotor speed of the turbine may substantially maintain its optimum tip speed ratio as the turbine structure moves in wave-induced oscillations.

4. A controller as claimed in claim 1, wherein the torque of the load presented to the rotor is controlled based upon an input indicative of the motion of the turbine.

5. A controller as claimed in claim 4, wherein the input signal is based upon the tower top velocity of the structure.

6. A controller as claimed in claim 5, wherein the input signal based on the tower velocity is used to determine a wave component of the desired rotor velocity due to wave-induced motion of the tower based upon the desired tip speed ratio.

7. A controller as claimed in claim 6, wherein a desired reference rotor velocity is defined as the sum of the wave-induced component and a steady-state wind component, the reference velocity being used to calculate the desired torque of the load presented to the rotor.

8. A controller as claimed in claim 7, wherein the controller calculates two components of the desired torque of the load presented to the rotor, one based on the low pass filtered rotor velocity wind component and one based on the wave-induced rotor velocity component, the two components being summed to produce the desired torque value.

9. A controller as claimed in claim 1, comprising: a control loop having first and second branches, the first branch having as its input the rotor speed of the turbine, wherein a low pass filter is applied thereto and the wind component of the desired torque is obtained using the filtered value; the second branch having as its input the difference between the rotor speed and a reference rotor speed and being arranged to calculate the wave component of the desired torque using a proportional or proportional derivative controller; the outputs of the two branches being summed to determine the desired value of torque.

10. A controller as claimed in claim 1, the controller having inputs for signals representing measured tower velocity and an estimate of mean wind speed.

11. A controller as claimed in claim 10 comprising a single control loop wherein a value of the actual rotor velocity is compared to a reference rotor velocity, the reference rotor velocity being based on the tower velocity and the mean wind speed, the difference being used to determine the desired torque value using a proportional or proportional derivative controller.

12. A wind turbine comprising a controller as claimed in claim 1.

13. A floating wind turbine structure comprising a buoyant tower having a wind turbine mounted thereto and a controller, the wind turbine being arranged to drive a load which presents a torque thereto and being adapted to extract energy from wave-induced motion of the turbine, the turbine having a variable rotor speed, wherein the controller controls the rotor speed of the turbine by controlling the torque of the load such that the rotor speed varies in response to wave-induced motion.

14. A method of controlling a floating wind turbine such that the wind turbine extracts energy from wave-induced motion of the turbine, the turbine having a rotor with a variable rotor speed and a plurality of blades, wherein the rotor speed of the turbine is controlled by controlling a torque of a load presented to the rotor such that the rotor speed varies in response to wave-induced motion.

15. A method as claimed in claim 14, wherein the blade pitch of the turbine remains substantially at its minimum setting whilst the turbine is controlled during wave induced oscillations.

16. A method as claimed in claim 14, wherein the rotor speed of the turbine may substantially maintain its optimum tip speed ratio as the turbine structure moves in wave-induced oscillations.

17. A method as claimed in claim 14, wherein torque of the load presented to the rotor is controlled based upon an input indicative of the motion of the turbine.

18. A method as claimed in claim 17, wherein the input signal is based upon the tower top velocity of the structure.

19. A method as claimed in claim 18, wherein the input signal based on the tower velocity is used to determine a wave component of the desired rotor velocity due to wave-induced motion of the tower based upon the desired tip speed ratio.

20. A method as claimed in claim 19, wherein a desired reference rotor velocity is defined as the sum of the wave-induced component and a steady-state wind component, the reference velocity being used to calculate the desired torque of the load presented to the rotor.

21. A method as claimed in claim 20, wherein the method comprises calculating two components of the desired torque of the load presented to the rotor, one based on the low pass filtered rotor velocity wind component and one based on the wave-induced rotor velocity component, the two components being summed to produce the desired torque value.

22. A method as claimed in claim 14, comprising: providing a control loop having first and second branches, inputting into the first branch the rotor speed of the turbine, applying a low pass filter thereto and obtaining the wind component of the desired torque using the filtered value; inputting into the second branch the difference between the rotor speed and a reference rotor speed and calculating the wave component of the desired torque using a proportional or proportional derivative controller; summing the outputs of the two branches to determine the desired value of torque.

23. A method as claimed in claim 14, comprising inputting signals representing measured tower velocity and an estimate of mean wind speed.

24. A method as claimed in claim 23, comprising providing single control loop in which a value of the actual rotor velocity is compared to a reference rotor velocity, the reference rotor velocity being based on the tower velocity and the mean wind speed, and using the difference to determine the desired torque value using a proportional or proportional derivative controller.

25. A software product comprising instructions which when executed by a processor cause the processor to control a floating wind turbine structure such that the wind turbine extracts energy from wave-induced motion of the turbine, the turbine having a variable rotor speed and a plurality of blades, wherein the rotor speed of the turbine is controlled by controlling a torque of a load presented to the rotor such that the rotor speed varies in response to wave-induced motion.

26. A product as claimed in claim 25, wherein the software product is a physical data carrier.

27. A method of manufacturing a software product which is in the form of a physical carrier, comprising storing on the data carrier instructions which when executed by a processor cause the processor to control a floating wind turbine structure such that the wind turbine extracts energy from wave-induced motion of the turbine, the turbine having a variable rotor speed and a plurality of blades, wherein the rotor speed of the turbine is controlled by controlling a torque of a load presented to the rotor such that the rotor speed varies in response to wave-induced motion.

28. A controller as claimed in claim 1, wherein the load comprises a generator load.

* * * * *